P. A. BAUER.
HARROW AND TRUCK.
APPLICATION FILED JULY 24, 1916.
1,244,016.
Patented Oct. 23, 1917.
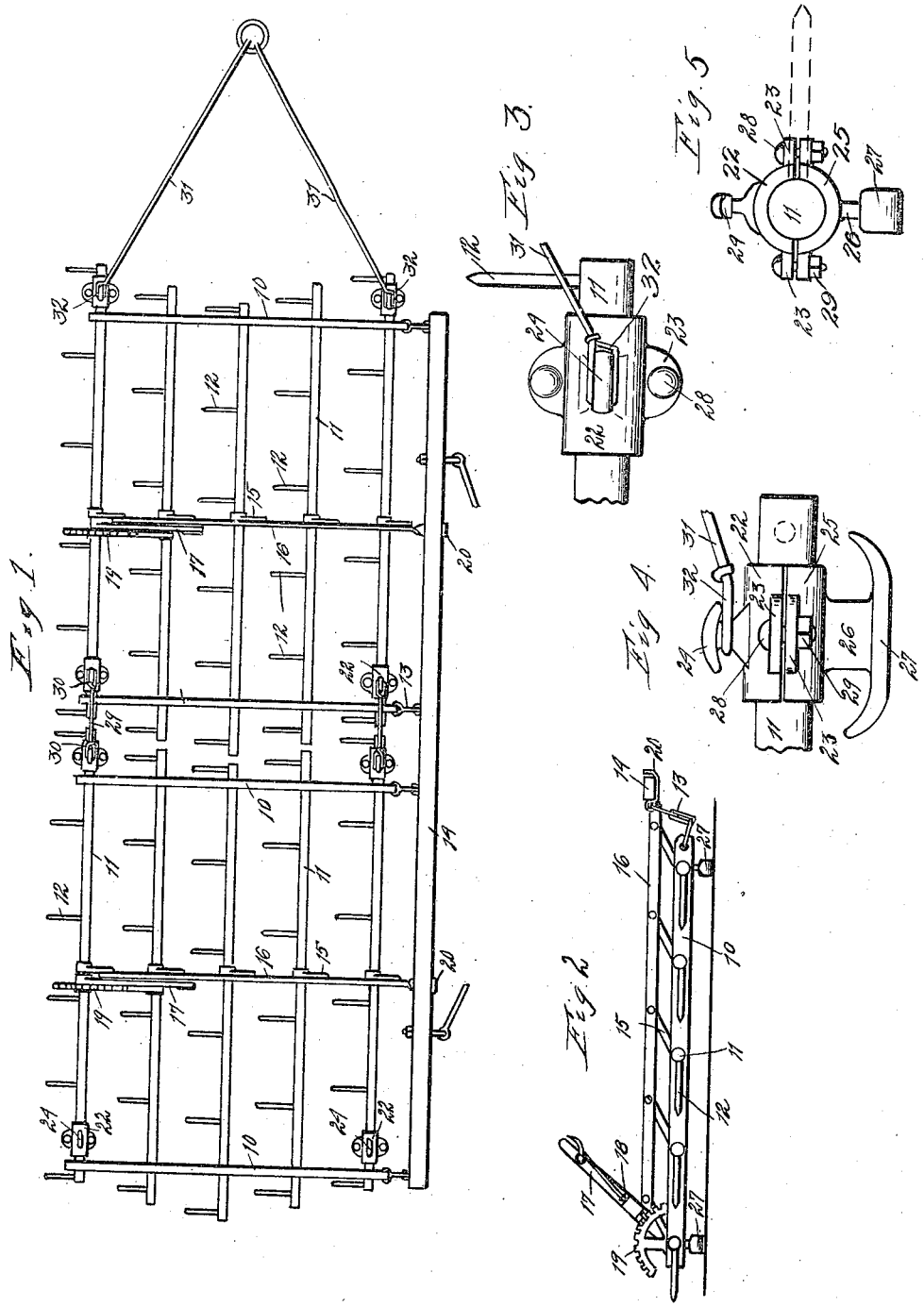
Inventor
Pearl A. Bauer
Witness
G. F. Tuschek

UNITED STATES PATENT OFFICE.

PEARL A. BAUER, OF COLFAX, IOWA.

HARROW AND TRUCK.

1,244,016.  Specification of Letters Patent.  Patented Oct. 23, 1917.

Application filed July 24, 1916. Serial No. 111,083.

*To all whom it may concern:*

Be it known that I, PEARL A. BAUER, a citizen of the United States, and resident of Colfax, in the county of Jasper and State of Iowa, have invented a certain new and useful Harrow and Truck, of which the following is a specification.

The object of my invention is to provide a harrow and truck of comparatively simple, durable and inexpensive construction.

A further object is to provide a harrow of the type having rotatable teeth carrying members, and in connection therewith detachable members adapted to be readily and easily mounted upon said teeth carrying members having thereon suitable runners or the like adapted to travel on the ground and also suitable attaching devices.

More particularly it is my object to provide such an attachment of very simple and inexpensive construction which can be readily and easily attached to any ordinary harrow or removed therefrom without special skill and with ordinary tools.

A further object is to provide such a device including an attachment having runners or the like so arranged that a plural section harrow may be moved over the ground on said runners with the sections following each other in succession instead of being arranged side by side as when they are used for cultivation.

My invention consists in the construction, arrangement and combination of the various parts of the device whereby the objects contemplated are attained as hereinafter more fully set forth, pointed out in my claim and illustrated in the accompanying drawings, in which:

Figure 1 shows a top or plan view of a two section harrow equipped with a truck attachment embodying my invention.

Fig. 2 shows a side elevation of the same.

Fig. 3 shows a top or plan view of a portion of one of the teeth holding members having my improved truck attachment secured thereto.

Fig. 4 shows a side elevation of the same, and

Fig. 5 shows a front elevation of the same.

In the illustration of my invention shown in the accompanying drawings, I have used the reference numeral 10 to indicate generally the fore-and-aft longitudinal frame members of a harrow in which are rotatably mounted the transverse teeth holding members 11, preferably made of tubing.

In the drawings I have shown two harrow sections which are similar in structure.

In the members 11 are mounted harrow teeth 12 in any suitable way.

The harrow sections are arranged side by side for use as shown in Fig. 1.

Secured to the frame member 10 by means of chains 13 or other suitable flexible devices is a long draw bar 14.

For rotating the members 11, and thereby regulating the angle of the teeth 12 with relation to the ground to be cultivated, I have secured to the members 11, arms 15 arranged parallel with each other and extending upwardly from the members 11.

Pivoted to the upper ends of the arms 15 is a horizontal connecting bar 16 arranged fore-and-aft in the machine and having forwardly and rearwardly projecting ends.

The rear end of the connecting bar 16 is pivotally secured to a lever 17, having an ordinary spring actuated pawl 18 adapted to coact with the sector 19 mounted on the two rearward frame members 11.

The forwardly projecting portions of the connecting bars 16 are bent to form suitable receiving devices 20 for the draw bar 14, so that the draw bar may be held in position resting in the devices 20 when desired.

My improved truck attachment comprises four devices for each harrow section. One of said devices I will now describe.

The upper portion of each truck attachment device comprises a downwardly opening semi-cylindrical member 22 having at its side near its edge laterally extending flanges 23.

At the central portion of its outer surface the semi-cylindrical member 22 rests upon one of the frame members 11. Receiving the opposite half of the frame member 11 is a similar semi-cylindrical upwardly opening member 25 having at its sides near its free edges, flanges 23 similar to those already described.

At its central outer portion, the member 25 is provided with an outwardly extending lug 26 secured to the outer end of which is a runner 27 or other suitable device for traveling on the ground. The adjacent flanges 23 of the members 22 and 25 are secured together by means of bolts 28 and nuts 29.

The size of the members 22 and 25 is such that their edges do not quite touch when they are installed on the member 11, so that the bolts 28 and nuts 29 may be used for drawing the flanges 23 together for causing the member 11 to be very firmly gripped between the members 22 and 25.

In installing the truck attachment, the lever 17 is preferably manipulated until the teeth 12 stand substantially in vertical position. The members 22 and 25 are then installed on the frame members 11 with the lugs 26 lying in a horizontal plane and extending away from the members 11 at right angles to the teeth. The lugs are so arranged that when the lever 17 is moved in the proper direction the members 11 will then be rotated bringing the teeth 12 to horizontal position, as shown in Fig. 2, while at the same time the lugs 26 are drawn to vertical position where the runners or other suitable device 27 are rested upon the surface of the ground.

It will be understood that I do not confine myself to the use of runners 26, and intend to cover by my application any suitable device for carrying the harrow sections over the ground.

In the practical use of my improved harrow truck, it will be seen that the harrow may be used in the field in the ordinary way, without any interference from the truck attachment. When, however, it is desired to draw the harrow along the road for any considerable distance, the members 11 may be rotated for bringing the runners 27 to position resting on the ground.

The successive sections of the harrow are then secured together at their adjacent ends by means of connecting rods 29 having at each end an eye 30 adapted to receive one end of the hook device 24. The draw bar 14 is placed in the members 20. Rods 31 having eyes 32 are arranged at one end of the harrow and placed in position with the eyes 32 receiving the members 24 at that end.

The team may be hitched to the rods 31 in any suitable way.

It will be seen that by the arrangement just described the harrow sections can be drawn upon the runners 27 over the hard ground without interfering with the road and with a great reduction in the draft that would exist if the harrow sections had to be dragged on their teeth.

The change from the position of the harrow sections where they travel upon their teeth to their position for traveling upon the truck attachment can be made almost instantly.

On account of the fact that the team is hitched at one end of the series of harrow sections, and the further fact that the harrow sections are secured together end to end, the harrow sections can be drawn along the ground and the width of the harrow is then only equal to half of one section.

This makes it possible to draw the harrow through narrow gates and the like which could not be done otherwise without unfastening the draw bar 14 and taking the harrow sections through one at a time or stacking them one above the other.

Many of the advantages of my improved truck attachment may be seen from the foregoing explanation.

It is my intention to cover by my present application any such changes or modifications of structure of use of mechanical equivalents which may be reasonably included within the scope of my claim.

I claim as my invention:

In a device of the class described, a pair of oppositely opening channel-shaped members having opposite adjacent flanges, means for securing the flanges of the opposite members together, one of said channel-shaped members having on its outer surface an outwardly projecting engaging device, the other of said channel-shaped members having on its outer surface, an outwardly projecting lug, and a runner or the like thereon.

PEARL A. BAUER.

Copies of this patent may be obtained for five cents each, by addressing the "Commissioner of Patents, Washington, D. C."